US010904362B2

(12) United States Patent
Morishita et al.

(10) Patent No.: US 10,904,362 B2
(45) Date of Patent: Jan. 26, 2021

(54) GAME RECAP PUSH ADVERTISEMENTS

(71) Applicant: GungHo Online Entertainment, Inc., Tokyo (JP)

(72) Inventors: Kazuki Morishita, Tokyo (JP); Ken Narita, Tokyo (JP)

(73) Assignee: GungHo Online Entertainment, Inc., Tokyo (JP)

( * ) Notice: Subject to any disclaimer, the term of this patent is extended or adjusted under 35 U.S.C. 154(b) by 32 days.

(21) Appl. No.: 16/447,850

(22) Filed: Jun. 20, 2019

(65) Prior Publication Data

US 2019/0312954 A1 Oct. 10, 2019

Related U.S. Application Data

(63) Continuation of application No. 14/939,764, filed on Nov. 12, 2015, now Pat. No. 10,476,990, which is a
(Continued)

(51) Int. Cl.
*G06Q 30/06* (2012.01)
*H04L 29/08* (2006.01)
(Continued)

(52) U.S. Cl.
CPC ......... *H04L 67/36* (2013.01); *G06Q 20/3224* (2013.01); *G06Q 20/40* (2013.01);
(Continued)

(58) Field of Classification Search
CPC ........ A63F 13/35; A63F 13/537; A63F 13/61; A63F 13/79; A63F 13/87; G06Q 30/0241;
(Continued)

(56) References Cited

U.S. PATENT DOCUMENTS

2009/0327077 A1 12/2009 Do-Sung
2013/0151342 A1 6/2013 Citron et al.

FOREIGN PATENT DOCUMENTS

EP 2922007 A1 9/2015
JP 2010-509630 A 3/2010
(Continued)

OTHER PUBLICATIONS

Japanese International Search Report in PCT/JP2015/076553 dated Nov. 17, 2015 in 3 pages.
(Continued)

*Primary Examiner* — Lawrence S Galka
(74) *Attorney, Agent, or Firm* — Knobbe Martens Olson & Bear, LLP

(57) ABSTRACT

Provide, to a user, a banner with which it may be possible to arouse an interest of the user with respect to a specific application. A banner relating to an application that has been executed on a terminal device can be displayed on the terminal device. The banner can be generated on the basis of information unique to the terminal device or to a user thereof, the information being collected by a server device during execution of the application. Examples of the unique information include information relating to video displayed on the terminal device during execution of the application, and information relating to manipulations inputted to the terminal device during the execution of the application. Examples of a banner include media that include the video, and media that reproduce the manipulations on the terminal device on the basis of information relating to the manipulations.

13 Claims, 12 Drawing Sheets

Related U.S. Application Data continuation of application No. PCT/JP2015/076553, filed on Sep. 17, 2015.

(51) Int. Cl.

| | | |
|---|---|---|
| *H04W 4/21* | (2018.01) | |
| *G07F 17/32* | (2006.01) | |
| *G06Q 20/40* | (2012.01) | |
| *G06Q 20/32* | (2012.01) | |
| *H04W 4/021* | (2018.01) | |
| *H04N 21/488* | (2011.01) | |
| *H04N 21/81* | (2011.01) | |
| *H04N 21/478* | (2011.01) | |
| *H04L 29/06* | (2006.01) | |

(52) U.S. Cl.
CPC ...... *G07F 17/3223* (2013.01); *G07F 17/3237* (2013.01); *H04L 67/20* (2013.01); *H04L 67/22* (2013.01); *H04L 67/30* (2013.01); *H04L 67/42* (2013.01); *H04N 21/4781* (2013.01); *H04N 21/4886* (2013.01); *H04N 21/812* (2013.01); *H04N 21/8173* (2013.01); *H04W 4/021* (2013.01); *H04W 4/21* (2018.02)

(58) Field of Classification Search
CPC ........... G06Q 30/0251; G06Q 30/0255; G06Q 30/2062; G06Q 30/0269
See application file for complete search history.

(56) References Cited

FOREIGN PATENT DOCUMENTS

| JP | 5313409 B1 | 10/2013 |
|---|---|---|
| JP | 2014-099111 A | 5/2014 |
| WO | WO 2008/056844 A1 | 5/2008 |
| WO | WO 2008/056946 A1 | 5/2008 |
| WO | WO 2012/177951 A1 | 12/2012 |

OTHER PUBLICATIONS

Supplementary European Search Report for European App. No. 15904112.8, dated Feb. 5, 2019, in 7 pages.

FIG.8

| USER ID | FIRST APPLICATION | MOST RECENT DATE OF EXECUTION | SCHEDULE INFORMATION (2015/8/18) | VIDEO INFORMATION/ MANIPULATION INFORMATION |
|---|---|---|---|---|
| A | ABC QUEST (GAME) | 2015/7/22 | WORK (9:00 AM–6:00 PM) FAREWELL PARTY (8:00–10:30 PM) | SCENE IN WHICH CHARACTER DEVELOPED SCENE INDICATING VICTORY IN BATTLE |
| B | ABC QUEST (GAME) | 2015/8/2 | SUMMER VACATION | SCENE INDICATING VICTORY IN BATTLE SCENE IN WHICH ITEM WAS OBTAINED |
| C | GHI PUZZLE (GAME) | 2015/7/25 | WORK (9:00 AM–5:30 PM) | SCENE IN WHICH GOOD SCORE WAS ACQUIRED |
| D | KLM DRAGON (GAME) | 2015/8/17 | WORK (8:00 AM–6:30 PM) | SCENE IN WHICH ITEM WAS OBTAINED |
| E | KLM DRAGON (GAME) | 2015/8/7 | SUMMER VACATION | SCENE IN WHICH CHARACTER DEVELOPED |

US 10,904,362 B2

GAME RECAP PUSH ADVERTISEMENTS

This application is based upon and claims priority to International Application No. PCT/JP2015/076553 filed on Sep. 18, 2015, the entire contents of which are hereby incorporated herein by reference.

TECHNICAL FIELD

The disclosure relates to a device or a method, e.g., to a server device, non-transitory computer-readable medium, and method.

BACKGROUND

Server devices are known in which advertisement information is displayed on a portable terminal (see, e.g., patent reference 1).

PRIOR ART REFERENCES

Patent References

Patent Reference 1: Japanese Laid-Open Patent Application 2014-99111.

SUMMARY

The purpose of the disclosure is to provide a novel device and method, e.g., a novel server device, non-transitory computer-readable medium, and method.

The server device disclosed in the disclosure has: a communicating unit for receiving a signal that includes banner generation information, the signal being transmitted from a terminal device capable of executing, e.g., a first application and a second application that is different from the first application, and transmitting a banner signal to the terminal device; and a generating unit for generating the banner signal on the basis of the signal that includes the banner generation information.

The non-transitory computer-readable medium in which a computer program disclosed in the disclosure is stored, the computer program controls a computer for transmitting/receiving signals to/from a terminal device capable of executing, e.g., a first application and a second application that is different from the first application, the computer being controlled such that a banner signal generated on the basis of a signal that is transmitted from the terminal device and includes banner generation information is transmitted to the terminal device.

The method disclosed in the disclosure comprises: receiving a signal that includes banner generation information, the signal being transmitted from a terminal device capable of executing, e.g., a first application and a second application that is different from the first application; generating a banner signal on the basis of the banner generation information; and transmitting the banner signal to the terminal device.

The disclosure makes it possible to provide a novel device and method, e.g., to provide a novel server device, non-transitory computer-readable medium, and method.

BRIEF DESCRIPTION OF THE DRAWINGS

FIG. 8 shows one example of information stored in the server device.

DETAILED DESCRIPTION

One example of the device and method disclosed in the disclosure is described in detail below with reference to the drawings.

I. Outline

The disclosure discloses displaying a novel banner on a terminal device. In the disclosure, the term "banner" refers to a display object displayed on at least a portion of a screen of a terminal device, a specific application being launched when a signal indicating that the display object has been selected is inputted to the terminal device. In the disclosure, the term "application" refers to software that executes a specific task in the terminal device.

Specifically, the disclosure discloses displaying, on a terminal device, a banner relating to an application that has previously been executed in the terminal device. The banner is generated on the basis of information unique to the terminal device or to a user thereof, the information being collected by a server device during execution of the application. Examples of the unique information include information relating to video displayed on the terminal device during execution of the application, and information relating to manipulations inputted to the terminal device during the execution of the application. Examples of a banner include media that include the video, and media that reproduce the manipulations on the terminal device on the basis of information relating to the manipulations.

In the disclosure, information that is collected by a server device during execution of an application and then used as a banner for the application shall be referred to as "banner generation information." A signal that is transmitted from the server to the terminal device, the signal indicating that a banner is to be displayed on the terminal device, shall be referred to as a "banner signal." Information that is collected by a server device during execution of an application and then used when evaluating whether or not to transmit a banner signal for the application shall be referred to as "evaluation information".

II. Details

1. System

Figure 1:
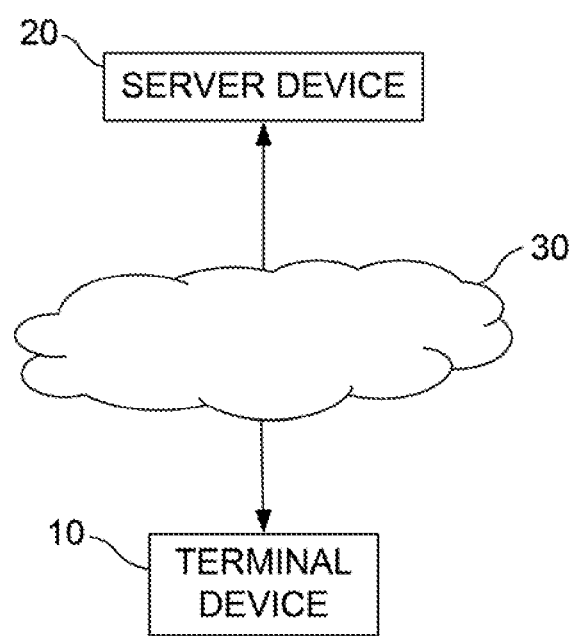
FIG. 1 shows one example of a system.

FIG. 1 shows one example of the system disclosed in the disclosure. The system shown in FIG. 1 has a terminal device 10, and a server device 20 capable of communicating with the terminal device 10 via a network 30.

Various applications can be executed in the system shown in FIG. 1. In the disclosure, an application may be software that runs on the operating system (OS) of the server device 20, the software being accessed by the terminal device 10 via the network, or may be software installed in the terminal device 10, new information being downloaded from an appropriate server device in connection with the execution of the software.

(1) Terminal Device

Figure 2:
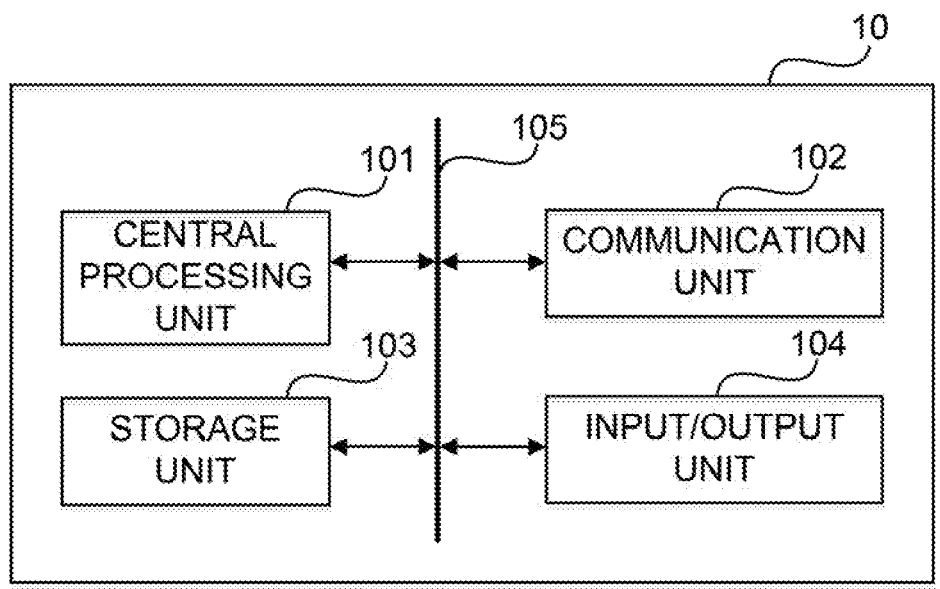
FIG. 2 shows an example of the configuration of a terminal device.

FIG. 2 shows an example of the configuration of the terminal device disclosed in the disclosure. The terminal device 10 shown in FIG. 2 includes a central processing unit 101, a communication unit 102, a storage unit 103, and an input/output unit 104. These structural elements are electrically connected to each other by a bus 105. However, the terminal device disclosed in the disclosure is not limited to comprising only the configuration of the terminal device 10 shown in FIG. 2. Specifically, a terminal device to which structural elements not shown in FIG. 2 have been added can be applied as the terminal device disclosed in the disclosure.

The central processing unit 101 executes commands included in software stored in the storage unit 103. Specifically, the central processing unit 101 controls the communication unit 102 for transmitting various items of information to the server device 20, processes calculations based on manipulation of the input/output unit 104 by a user, controls the input/output unit 104 for providing specific information to the user, and performs other such functions. For example, the central processing unit 101 can control the communication unit 102 such that the communication unit 102 transmits a signal including specific information to the server device 20. Examples of the specific information include evaluation information used in the server device 20 when evaluating whether or not to transmit a banner signal for a specific application, and banner generation information used when generating the banner signal. Additionally, the central processing unit 101 can control the input/output unit 104 such that the input/output unit 104 presents a banner to a user on the basis of a banner signal received by the communication unit 102.

The communication unit 102 is implemented as hardware, firmware, communication software such as a TCP/IP driver and a PPP driver, or a combination of these, the communication unit 102 being configured to be capable of communicating with the server device 20 via the network 30 shown in FIG. 1.

The storage unit 103 is used in order to store programs executed by the central processing unit 101, and is configured from a dynamic random access memory (DRAM), a static random access memory (SRAM), a hard disk drive (HDD), and/or a flash memory or the like. The storage unit 103 may also be configured to include volatile storage configured from a DRAM and non-volatile storage configured from a HDD. The non-volatile storage can store a variety of software that can be executed in the terminal device 10, such as an operating system. The volatile storage can store applications read out from the non-volatile storage that are being executed in the terminal device 10. The non-volatile storage or the volatile storage can store a banner signal transmitted from the server device 20, or a signal transmitted to the server device 20 that includes evaluation information or banner generation information.

The input/output unit 104 may be a single device by which both input and output are performed, or may comprise a device by which input is performed and a device by which output is performed that are separate from each other. An example of a device by which both processes are performed is a touch panel. Examples of a device by which input is performed include a keyboard, a button, a touch pad, a mouse, a microphone, a gyro sensor, or the like. Examples of a device by which output is performed include a display panel, a speaker, a vibrating element, or the like. The input/output unit 104 may comprise a plurality of these devices. For example, the input/output unit 104 may comprise a touch panel, a speaker, and a vibrating element.

Figure 3:
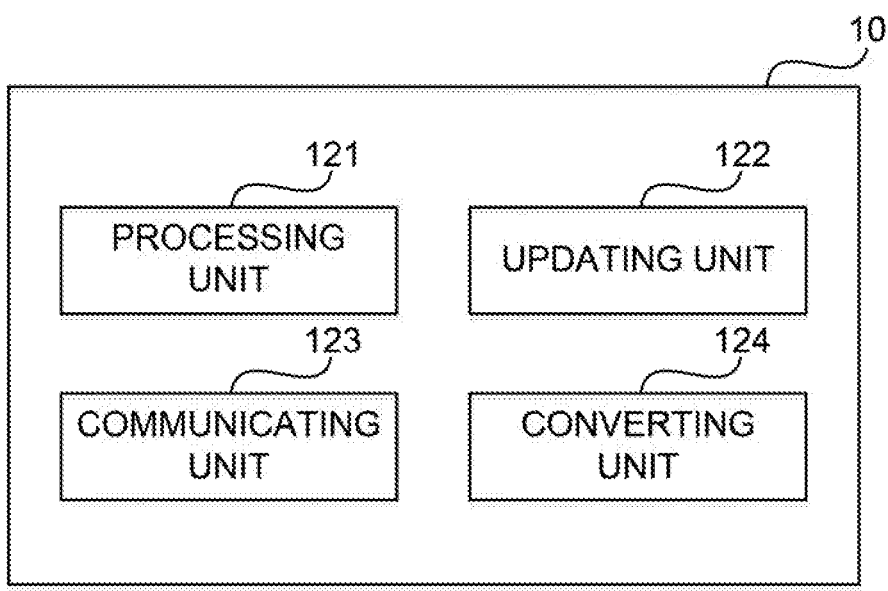
FIG. 3 is a block diagram showing the functions of the terminal device.

FIG. 3 is a block diagram showing one example of the functions realized by the terminal device disclosed in the disclosure. The terminal device 10 shown in FIG. 3 has a processing unit 121, an updating unit 122, a communicating unit 123, and a converting unit 124. However, the terminal device disclosed in the disclosure is not limited to comprising only the functions shown in FIG. 3. Specifically, a terminal device to which functions not shown in FIG. 3 have been added can be applied as the terminal device disclosed in the disclosure.

The processing unit 121 comprises a function for processing calculations pertaining to various signals. For example, the processing unit 121 comprises a function for processing calculations in accordance with manipulation of the terminal device 10 by a user.

The updating unit 122 comprises a function for updating prior information. For example, the updating unit 122 comprises a function for updating prior information stored in the terminal device 10, on the basis of the results of processing calculations executed in the processing unit 121 upon execution of an application or on the basis of information relating to the application that has been transmitted from the server device 20.

The communicating unit 123 comprises a function for transmitting signals to the server device 20, and receiving signals transmitted by the server device 20. For example, the communicating unit 123 comprises a function for transmitting a signal for requesting permission from the server device 20 to execute a specific application, and receiving a signal that includes information necessary to execute the specific application. Furthermore, the communicating unit 123 comprises a function for transmitting a signal that includes the aforementioned evaluation information and/or banner generation information to the server device 20, and receiving the aforementioned banner signal from the server device 20.

The converting unit 124 comprises a function for converting manipulation of the terminal device 10 by a user and other non-electronic signals into electronic signals, and converting electronic signals into signals that the user can perceive. For example, the converting unit 124 comprises a function for converting the touch of a user on a display screen of the terminal device 10 into an electronic signal, and converting an electronic signal into a still image, a video, a sound, and/or vibration of the terminal device 10. Furthermore, the converting unit 124 comprises a function for converting manipulation of the terminal device 10 by a user into a signal that includes evaluation information and/or banner generation information, and displaying, on a display screen of the terminal device 10 on the basis of a banner signal, a banner that relates to a specific application.

(2) Server Device

Figure 4:
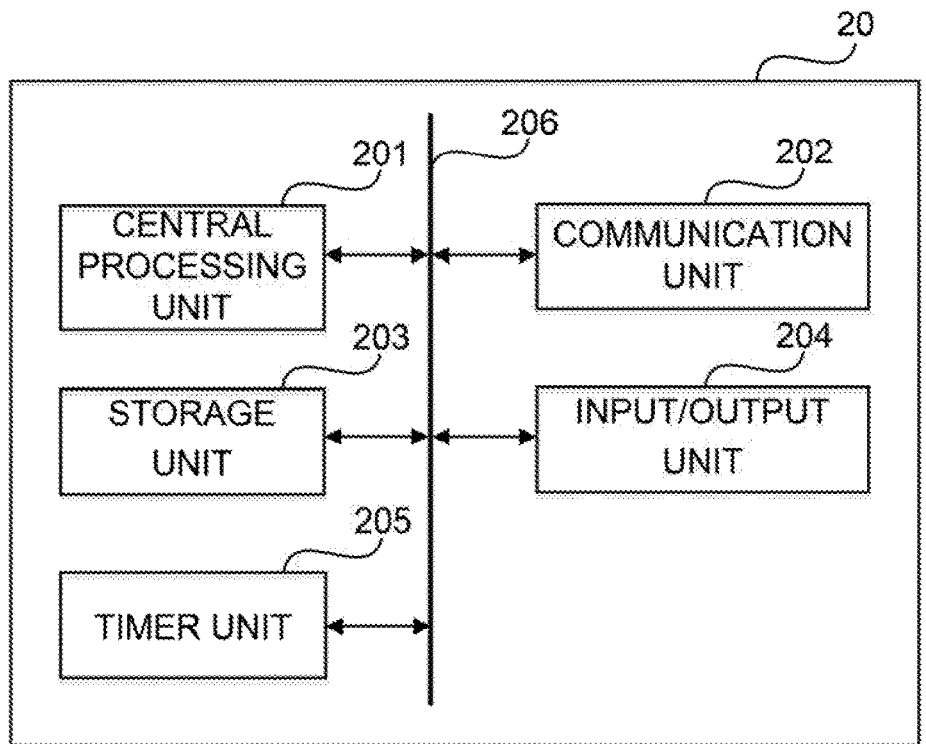
FIG. 4 shows an example of the configuration of a server device.

FIG. 4 shows an example of the configuration of the server device disclosed in the disclosure. The server device 20 shown in FIG. 4 includes a central processing unit 201, a communication unit 202, a storage unit 203, an input/output unit 204, and a timer unit 205. These structural elements are electrically connected to each other by a bus 206. However, the server device disclosed in the disclosure is not limited to comprising only the configuration of the server device 20 shown in FIG. 4. Specifically, a server device to which structural elements not shown in FIG. 4 have been added can be applied as the server device disclosed in the disclosure. Additionally, the server device disclosed in the disclosure is not limited to comprising all of the structural elements shown in FIG. 4. For example, a server device having no timer unit 205 can be applied as the server device disclosed in the disclosure.

The central processing unit 201 executes commands included in software stored in the storage unit 203. Specifically, the central processing unit 201 controls the communication unit 202 for transmitting various items of information to the terminal device 10, processes calculations based on manipulation of the input/output unit 204 by a provider, controls the input/output unit 204 for providing specific information to the provider, and performs other such functions. For example, the central processing unit 201 can control the communication unit 202 such that the communication unit transmits a signal including specific information to the terminal device 10. Examples of the signal include a signal for requesting that the terminal device 10 transmit the aforementioned evaluation information and/or banner generation information, and the aforementioned banner signal. The central processing unit 201 is also configured to have a function for evaluating whether or not to transmit the aforementioned banner signal on the basis of a time period measured by the timer unit 205 or the aforementioned evaluation information stored in the storage unit 203, and generating the aforementioned banner signal that uses the aforementioned banner generation information stored in the storage unit 203.

The communication unit 202 is implemented as hardware, firmware, communication software such as a TCP/IP driver and a PPP driver, or a combination of these, the communication unit 202 being configured to be capable of communicating with the terminal device 10 via the network 30 shown in FIG. 1.

The storage unit 203 is used in order to store programs executed by the central processing unit 201, and is configured from a dynamic random access memory (DRAM), a static random access memory (SRAM), a hard disk drive (HDD), and/or a flash memory or the like. The storage unit 203 may also be configured to include volatile storage configured from a DRAM and non-volatile storage configured from a HDD. The non-volatile storage can store a variety of software that can be executed in the server device 20, such as an operating system. The volatile storage can store software read out from the non-volatile storage that is being executed in the server device 20. The non-volatile storage or the volatile storage can store a banner signal transmitted to the terminal device 10, or evaluation information or banner generation information transmitted from the terminal device 10.

The input/output unit 204 may be a single input/output device, or may comprise an input device and an output device that are separate from each other. An example of an input/output device is a touch panel. Examples of an input device include a keyboard, a button, a touch pad, a mouse, a microphone, a gyro sensor, or the like. Examples of an output device include a display panel, a speaker, a vibrating element, or the like. The input/output unit 204 may comprise a plurality of these devices.

The timer unit 205 may be any type of device capable of measuring time. For example, the timer unit 205 may comprise a crystal resonator.

Figure 5:
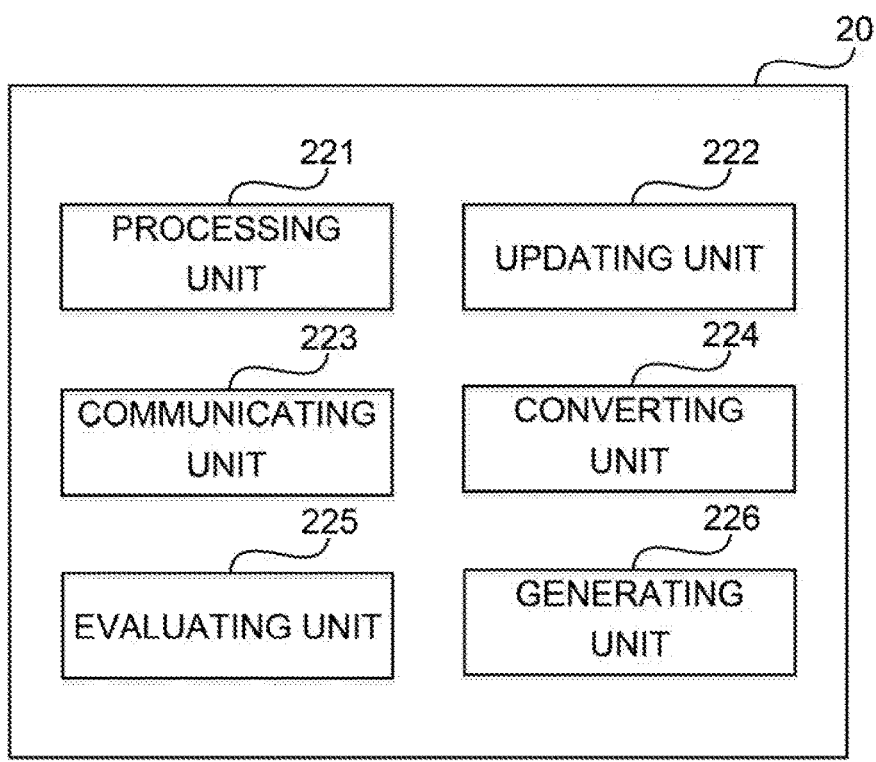
FIG. 5 is a block diagram showing the functions of the server device.

FIG. 5 is a block diagram showing one example of the functions realized by the server device disclosed in the disclosure. The server device 20 shown in FIG. 5 has a processing unit 221, an updating unit 222, a communicating unit 223, a converting unit 224, an evaluating unit 225, and a generating unit 226. However, the server device disclosed in the disclosure is not limited to comprising only the functions shown in FIG. 5. Specifically, a server device to which functions not shown in FIG. 5 have been added can be applied as the server device disclosed in the disclosure. Additionally, the server device disclosed in the disclosure is not limited to comprising all of the functions shown in FIG. 5. For example, a server device having no evaluating unit 225 can be applied as the server device disclosed in the disclosure.

The processing unit 221 comprises a function for processing calculations pertaining to various signals. For example, the processing unit 221 comprises a function for processing calculations in accordance with manipulation of the server device 20 by a provider or a signal transmitted from the terminal device 10.

The updating unit 222 comprises a function for updating prior information. For example, the updating unit 222 comprises a function for updating prior information stored in the server device 20, on the basis of the results of processing calculations executed in the processing unit 221 or on the basis of a signal including information for updating user information transmitted from the terminal device 10.

The communicating unit 223 comprises a function for receiving signals transmitted by the terminal device 10, and transmitting signals to the terminal device 10. For example, the communicating unit 223 comprises a function for receiving a signal for requesting permission to execute a specific application in the terminal device 10, and transmitting a signal that includes information necessary to execute the specific application in the terminal device 10. Furthermore, the communicating unit 223 comprises a function for receiving a signal that includes the aforementioned evaluation information and/or banner generation information from the terminal device 10, and transmitting the aforementioned banner signal to the terminal device 10.

The converting unit 224 comprises a function for converting manipulation of the server device 20 by a provider and other non-electronic signals into electronic signals, and converting electronic signals into signals that the provider can perceive. For example, the converting unit 224 comprises a function for converting pressure on a keyboard attached to the server device 20 into an electronic signal, and converting an electronic signal into a still image or a video displayed on the server device 20.

The evaluating unit 225 comprises a function for evaluating whether or not to transmit the aforementioned banner signal to the terminal device 10. This evaluation may be performed on the basis of the time period from the most recent time when the specific application was executed until the present time, or the aforementioned evaluation information. Specifically, a configuration may be adopted such that a determination to transmit a banner signal to the terminal device 10 is made when the time period exceeds a prescribed time period, or when, upon collecting information relating to a user schedule that was entered into the terminal device 10 as the evaluation information, referring to the schedule reveals no scheduled event to have been entered.

The generating unit 226 comprises a function for using the aforementioned banner generation information transmitted from the terminal device 10, and generating a banner signal for a specific application. For example, the generating unit 226 comprises a function for using information relating to video displayed on the terminal device 10 during execution of the specific application, or information relating to manipulations inputted to the terminal device 10 during the execution of the specific application, and generating a banner signal.

(3) Sequence

Figure 6:
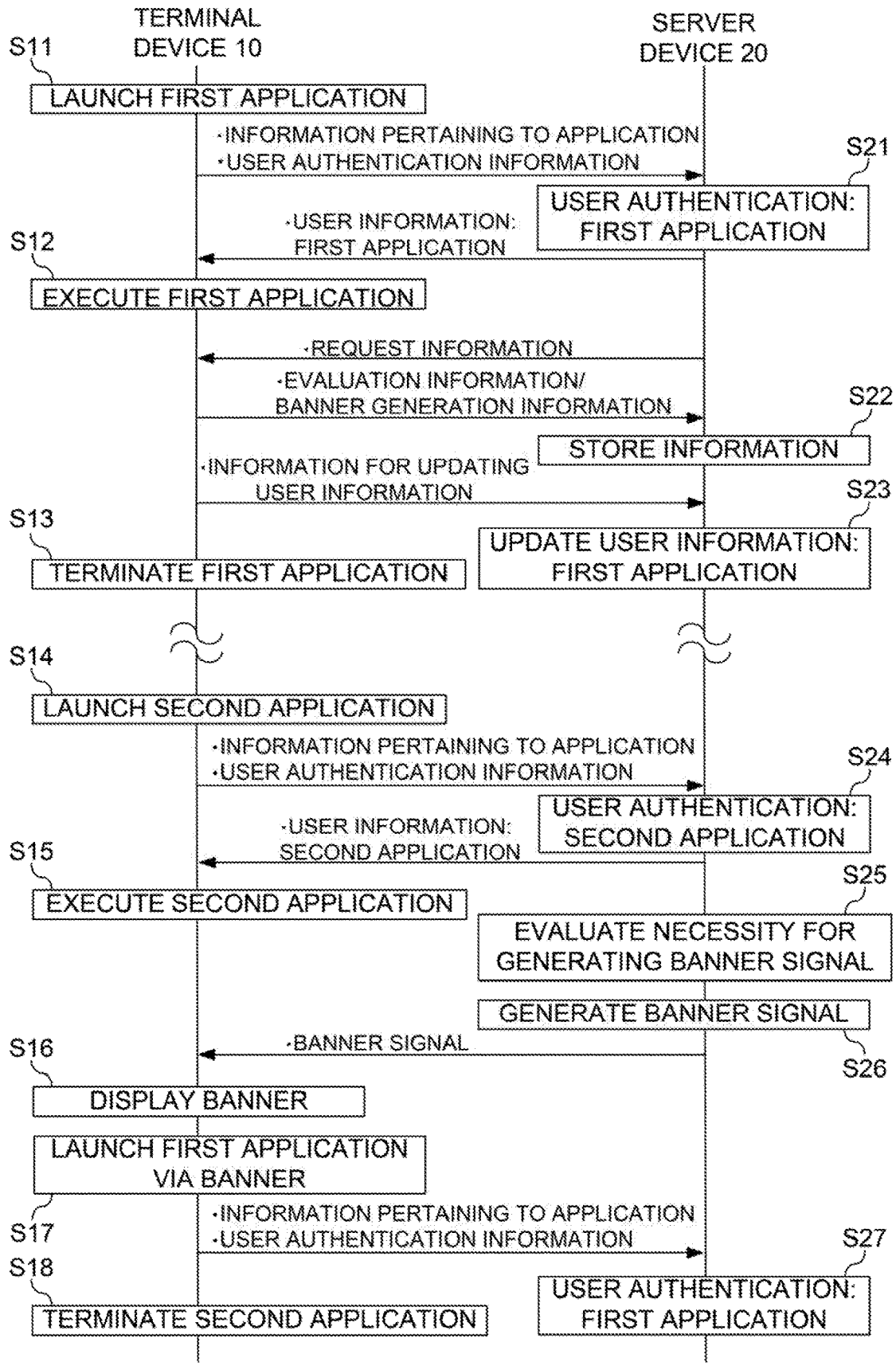
FIG. 6 shows one example of a sequence in the system.

FIG. 6 shows one example of a sequence in the system disclosed in the disclosure. Strictly speaking, the sequence shown in FIG. 6 is broadly divided into a phase (first phase) for collecting information relating to a specific application, and a phase (second phase) for displaying, on the terminal device 10, a banner relating to the specific application.

Specifically, in the first phase, the server device 20 collects evaluation information used when evaluating whether or not to display, on the terminal device 10, a banner relating to a specific application, and/or banner generation information used when generating the banner. In the second phase, the server device 20 evaluates whether or not to transmit a banner signal to the terminal device 10 on the basis of the evaluation information, and generates and transmits the banner signal.

A. First Phase

The sequence shown in FIG. 6 begins with launching a first application in the terminal device 10 (S11). Examples of the first application include games and the like. The terminal device 10 then transmits, to the server device 20, a signal including information for specifying the selected first application and identification information (ID) pertaining to the user using the terminal device 10.

Next, user authentication pertaining to the first application is performed in the server device 20 on the basis of the received user identification information (S21). A signal including information relating to the authenticated user, the information being necessary to execute the first application, is then transmitted to the terminal device 10. For example, saved data for a game may be transmitted to the terminal device 10.

Next, the first application is executed in the terminal device 10 (S12). This makes it possible to, e.g., continue the game on the terminal device 10 using the saved data as a starting point.

At this time, the server device 20 requests, during the execution of the first application, that the terminal device 10 transmit a signal including the aforementioned evaluation information and/or banner generation information to the server device 20. Upon receiving this request, the terminal device 10 transmits the evaluation information and/or banner generation information to the server device 20. The server device 20 then stores the evaluation information and/or banner generation information (S22).

The evaluation information and the banner generation information may be any type of information that is necessary for evaluating whether or not to generate the banner signal described below, or for generating the banner signal.

Examples of the evaluation information include information relating to the user schedule that was entered into the terminal device 10 and other such information.

Examples of the banner generation information include video information relating to video displayed on the terminal device 10 while the first application is executed, manipulation information relating to manipulation of the terminal device 10 by a user, audio information relating to audio received by the terminal device 10, and other such information. Furthermore, the server device 20 may collect this information together with metadata thereof as the banner generation information. Examples of metadata include: the time at which video information, manipulation information, or audio information is displayed, inputted, or detected; the weather at the position of the terminal device 10 at this time; and/or keywords or the like associated with this information.

Furthermore, when the first application is a game in which a score is assessed (e.g., a game in which points are determined in accordance with manipulations by a user, a game in which an opponent is present and in which one objective is to acquire more points than are acquired by the opponent, or the like), information relating to the score (e.g., the highest number of points acquired by the user in the past, the points acquired by the user and the opponent and the result (victory or defeat) of competition, or the like) may be collected as banner generation information. When the first application is a game in which items are acquired over the course of execution and/or a character manipulated by the user develops, information relating to the items and/or the developed character may be collected as banner generation information. This information may be collected as a portion of video information, or may be collected as still image information.

During execution of the first application, the terminal device 10 non-periodically transmits information for updating user information to the server device 20. When this occurs, the server device 20 updates the user information (S23). For example, when data is saved in the terminal device 10 during execution of a game, the saved data is transmitted from the terminal device 10 to the server device 20. The saved data is then stored in the server device 20.

Thereafter, the first application is terminated in the terminal device 10 (S13).

B. Second Phase

After the first phase, a second application that is different from the first application is launched in the terminal device 10 (S14). Examples of the second application include web browsers, social networking services (SNS), and games different from the game executed in the first phase. The terminal device 10 then transmits, to the server device 20, a signal including information for specifying the selected second application and identification information (ID) pertaining to the user using the terminal device 10.

Next, user authentication pertaining to the second application is performed in the server device 20 on the basis of the received user identification information (S24). A signal including information relating to the user is then transmitted to the terminal device 10. For example, in a case in which the second application is a web browser, resources or the like constituting the web page are transmitted to the terminal device 10. In a case in which the second application is a SNS, messages or the like transmitted from other users and stored in the server device 20 are transmitted. In a case in which the second application is a game different from the game executed in the first phase, saved data or the like pertaining to the game is transmitted to the terminal device 10.

Next, the second application is executed in the terminal device 10 (S15). For example, in a case in which the second application is a web browser, the web page is displayed on the terminal device 10. In a case in which the second application is a SNS, the messages from other users are displayed on the terminal device 10. In a case in which the second application is a game different from the game executed in the first phase, the game is continued on the terminal device 10 using the saved data as a starting point.

At this time, the server device evaluates, during the execution of the second application, whether it is necessary to generate a banner signal relating to the first application for the terminal device 10 (S25). In this evaluation, a determination to display the banner on the terminal device 10 can be made in a case in which, e.g., any of the following occur: (i) the time period from when the first application was terminated until the point in time when the evaluation is made exceeds a prescribed time period; (ii) the second application and the first application are associated with each other; (iii) the environment at the point in time when the evaluation is made satisfies a prescribed condition; or (iv) the evaluation information collected in the first phase satisfies a prescribed condition. The determination to display the banner on the terminal device 10 may also be made when a plurality of these conditions are satisfied.

A specific example of (i) described above includes a case in which the time period from when the first application was terminated until the point in time when the evaluation is made exceeds one week.

A specific example of (ii) described above includes a case in which the first application and the second application are both games of the same type. In this case, it is highly likely that a user who executes a game of the same type as the first application is interested in the first application itself. Therefore, the user is highly likely to launch the first application via a banner relating to the first application, the banner being displayed on the terminal device 10.

A specific example of (iii) described above includes a case in which rain or snow is falling at the point in time when the evaluation is made, the probability of precipitation given by a weather forecast at the point in time when the evaluation is made is equal to or greater than a prescribed value, and a warning is issued. Strictly speaking, the determination to display the banner can be made when the weather is bad. In this case, it is highly likely that a user who had had an outdoor scheduled event will change the scheduled event. Therefore, the user is highly likely to launch the first application via a banner relating to the first application, the banner being displayed on the terminal device 10.

A specific example of (iv) described above includes a case in which no scheduled event is listed in schedule information collected as evaluation information. In this case, the user is highly likely to launch the first application via a banner relating to the first application, the banner being displayed on the terminal device 10.

When the determination to display the banner pertaining to the first application on the terminal device 10 is made, a banner signal pertaining to the first application is then generated in the server device 20 (S26). The banner signal is generated on the basis of banner generation information collected in the first phase. For example, when video that was displayed on the terminal device 10 during execution of the first application is collected as banner generation information, a signal can be generated for displaying, on the terminal device 10, a banner that includes the displayed video (prior displayed video), a changed-perspective video in which the same setting as that in the prior displayed video is displayed from a different perspective than that actually displayed on the terminal device 10, non-displayed video which was not displayed on the terminal device 10 but which could have been displayed following the prior displayed video, or the like. Furthermore, audio received by the terminal device 10 may be reproduced together with the display of such video. Specifically, the banner signal is not limited to comprising a signal for displaying such video as a banner, but rather may comprise a signal for broadcasting audio in combination with the video.

When the first application is a game, examples of the prior displayed video include battle scenes and the like. Examples of the changed-perspective video include battle scenes displayed from the perspective of the enemy in battle and the like. Examples of the non-displayed video include: video that was not actually displayed due to defeat in the battle scene, but that displays a case of victory in the battle scene; and the like.

All of these examples of video are based on the first application that was executed in the past. Therefore, displaying a banner that includes at least a part of such video on the terminal device 10 makes it possible to arouse the interest of the user with respect to the first application. Specifically, the banner strongly encourages the user to launch the first application.

Furthermore, when the first application is a game in which a score is assessed, a signal for displaying, on the terminal device 10, a banner that displays at least some scores (e.g., the highest number of points acquired by the user in the past, the points acquired by the user and the opponent and the result (victory or defeat) of competition, or the like) may be transmitted to the terminal device 10 as a banner signal. When the first application is a game in which items are acquired over the course of execution and/or a character manipulated by the user develops, a signal for displaying, on the terminal device 10, a banner that displays at least some of the items and/or the developed character may be transmitted to the terminal device 10 as a banner signal.

The score and the items and/or developed character all relate to the first application executed by the user in the past. Therefore, displaying this data on the terminal device 10 as a banner makes it possible to arouse the interest of the user with respect to the first application. Specifically, the banner strongly encourages the user to launch the first application.

The banner signal may be a signal for displaying both information relating to the score, items, and/or developed character, and information relating to the aforementioned video and/or audio, on the terminal device 10.

The type of banner signal to be generated can be changed in accordance with the length of the time period from when the first application was terminated until the point in time when the evaluation is made. For example, a configuration may be adopted such that, when the time period exceeds one week and is less than one month, a signal for displaying a banner that includes prior displayed video on the terminal device 10 is generated, whereas when the time period exceeds one month, a signal for displaying a banner that includes non-displayed video on the terminal device 10 is generated.

Next, the server device 20 transmits a banner signal to the terminal device 10. This causes the terminal device 10 thereby to display a banner in accordance with the banner signal (S16), enabling a user of the terminal device 10 to launch the first application via the banner (S17).

As described above, the banner generated in accordance with the banner information strongly encourages the user to launch the first application via the banner. Accordingly, in the sequence described above, it is possible to effectively grant an opportunity to launch the first application on the terminal device 10.

When the first application is launched via the banner, the terminal device 10 transmits, to the server device 20, a signal including information for specifying the selected first application and identification information (ID) pertaining to the user using the terminal device 10. User authentication pertaining to the first application is then performed in the server device 20 on the basis of the received user identification information (S27). The second application is then terminated in the terminal device 10 (S18).

(4) Flowchart

Figure 7:
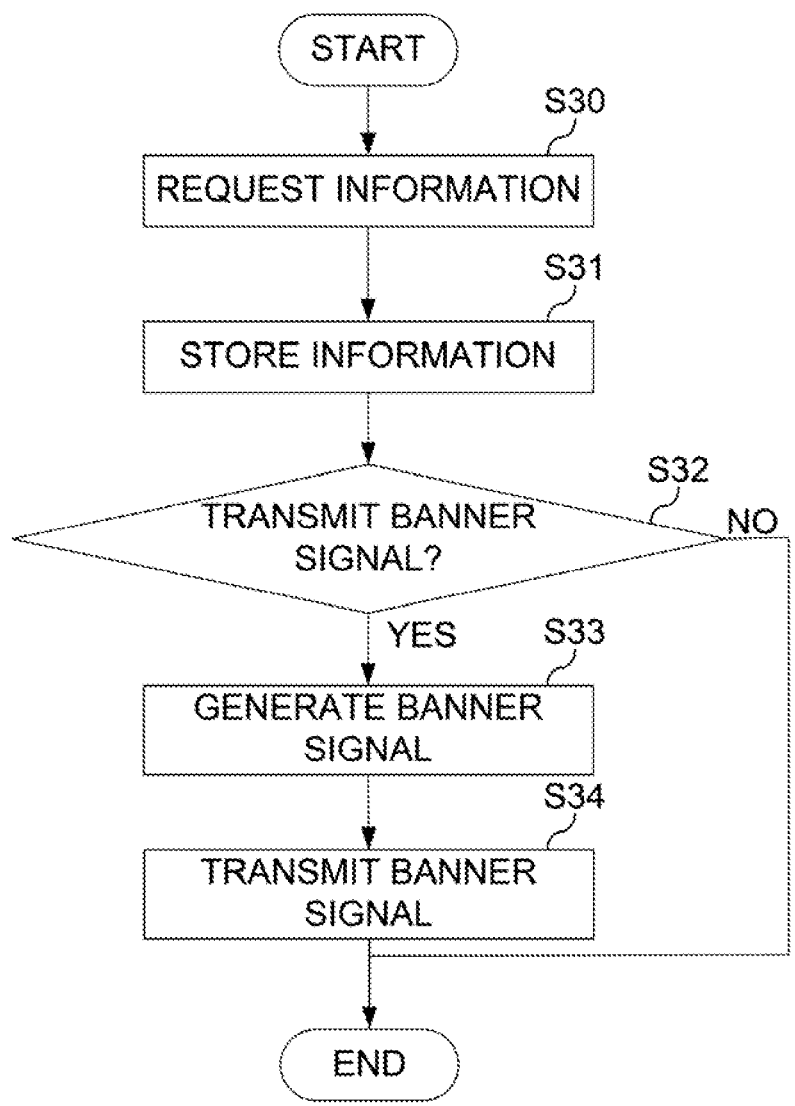
FIG. 7 shows one example of a flowchart of the operations of the server device.

FIG. 7 is a flowchart showing one example of the flow of operations in the server device disclosed in the disclosure.

The flowchart shown in FIG. 7 begins with the server device requesting that the terminal device transmit the aforementioned evaluation information and/or banner generation information (S30). The information transmitted from the terminal device in accordance with this request is then stored in the server device (S31).

Next, the server device evaluates whether or not to transmit a banner signal to the terminal device on the basis of the evaluation information (S32). When a determination to transmit a banner signal to the terminal device is made, a banner signal is generated in the server device on the basis of the banner generation information (S33). The generated banner signal is then transmitted to the terminal device (S34). However, when this is not the case, no banner signal is generated.

(5) Summary

The above-described example of the server device, non-transitory computer-readable medium, and method disclosed in the disclosure can be expressed, e.g., as described below.

For example, the server device can be expressed as a device having: a communicating unit for receiving a signal that includes banner generation information, the signal being transmitted from a terminal device capable of executing a first application and a second application that is different from the first application, and transmitting a banner signal to the terminal device; and a generating unit for generating the banner signal on the basis of the signal that includes banner generation information.

The non-transitory computer-readable medium in which a computer program is stored, the computer program can be expressed as controlling a computer for transmitting/receiving signals to/from a terminal device capable of executing a first application and a second application that is different from the first application, the control being performed such that a banner signal generated on the basis of a signal that is transmitted from the terminal device and includes banner generation information is transmitted to the terminal device.

The method can be expressed as comprising: receiving a signal that includes banner generation information, the signal being transmitted from a terminal device capable of executing a first application and a second application that is different from the first application; generating a banner signal on the basis of the banner generation information; and transmitting the banner signal to the terminal device.

The server device, non-transitory computer-readable medium, and method are capable of strongly encouraging a user to launch a first application via a banner. Specifically, the above achieve an effect for making it possible to effectively increase the chance that the first application will be launched and executed.

2. Modification

The aforementioned server device, non-transitory computer-readable medium, and method provide one example of the disclosure, and can be altered as appropriate.

For example, in the sequence shown in FIG. 6, a configuration is shown in which a signal including banner generation information is transmitted from the terminal device 10 to the server device 20 when a signal requesting the transmission of banner generation information is transmitted from the server device 20 to the terminal device 10; however, the request can be omitted. Specifically, in the sequence disclosed in the disclosure, a configuration may be adopted in which a signal including banner generation information is non-periodically transmitted from the terminal device 10 to the server device 20, even when there is no kind of request. For example, a configuration may be adopted in which a program that would perform, in the terminal device 10, transmission of a signal including banner generation information is built into the first application.

Additionally, in the sequence shown in FIG. 6, a configuration is shown in which banner generation information and information for updating user information are addressed separately; however, some of the information for updating user information can be transferred as banner generation information. For example, when a signal that includes information relating to items acquired over the course of execution of the first application and/or a character that developed over the course of execution of the first application is transmitted from the terminal device 10 to the server device 20 as information for updating user information, this information can be transferred as banner generation information.

Additionally, in the sequence shown in FIG. 6, a configuration is shown in which information for updating user information is transmitted from the terminal device 10 to the server device 20 before the first application is terminated; however, a configuration can be adopted in which information for updating user information is transmitted from the terminal device 10 to the server device 20 after the first application has been terminated.

Additionally, in the sequence shown in FIG. 6, a configuration is shown in which it is evaluated whether it is necessary to generate a banner signal; however, this evaluation can be omitted. Specifically, a configuration can be adopted in which, when the second application is launched, the server device automatically generates and transmits a banner signal based on banner generation information collected during execution of the first application.

Additionally, in the sequence shown in FIG. 6, a configuration is shown in which a banner signal is generated in the server device 20 after it is evaluated whether it is necessary to transmit a banner signal; however, the order of these events may be reversed. Specifically, in the sequence disclosed in the disclosure, a configuration can be adopted in which a banner signal is generated in the server device 20 in advance, and thereafter it is evaluated whether it is necessary to transmit the banner signal.

The processes and procedures described in the disclosure can be realized not only by what is expressly described in the embodiments, but also by software, hardware, or a combination thereof. Specifically, the processes and procedures described in the disclosure can be realized by implementing logic corresponding to the processes in an integrated circuit, volatile memory, non-volatile memory, a magnetic disk, optical storage, or another such medium. Additionally, the processes and procedures described in the disclosure can be implemented as computer programs, and various computers including the terminal device and the server device can be made to execute these processes/procedures.

Although the processes and procedures described in the disclosure were described as being executed using a single device, software, component, or module, a configuration can be adopted in which such processes or procedures are executed using multiple devices, multiple software, multiple components, and/or multiple modules. Additionally, although the various items of information described in the disclosure was described as being stored in a single memory unit or storage unit, a configuration can be adopted in which such information is dispersedly stored in a plurality of memory units provided to a single device, or in a plurality of memory units dispersedly arranged in a plurality of devices. Furthermore, a configuration can be adopted in which the software and hardware elements described in the disclosure are obtained by being consolidated into a smaller number of structural elements, or subdivided into a larger number of structural elements.

3. Specific Examples

An example is described below of the evaluation of whether it is necessary to generate a banner signal in the server device, and the generation of such a banner signal, as well as a banner displayed on the terminal device.

FIG. 8 shows one example of specific information stored in the server device. Specifically, in FIG. 8, the following are stored in association with each other: a user ID present in each of the devices; an application (first application) that has been executed in the terminal device; the day (most recent day of execution) that is closest to the present (for convenience, "the present" shall herein refer to 8 P.M. on 2015 Aug. 18) from among days on which the application was executed; and schedule information, as well as video information and/or manipulation information, that was collected by the server device during execution of the application on the most recent day of execution.

For example, the server device stores information indicating that the most recent time when the game application "ABC Quest" was executed in a terminal device provided with user ID "A" is 2015 Jul. 22. The server device also stores schedule information for 2015 Aug. 18 that was transmitted from the terminal device provided with user ID "A." The server device also stores video information and/or manipulation information relating to scenes that appeared during execution of the game, specifically a scene in which a character developed and a scene in which the character was victorious in a battle. The schedule information can be used as a type of the aforementioned evaluation information. The video information and/or manipulation information can be used as the aforementioned banner generation information.

A simulation is given here for a case in which a web browser (second application) is launched on 2015 Aug. 18 in each of five terminal devices provided with user IDs "A" through "E," and a portal site is displayed thereon.

(1) Terminal device provided with user ID "A"

The server device can make a determination not to transmit a banner signal to the terminal device on the basis of schedule information and the like for 8 P.M. on 2015 Aug. 18.

(2) Terminal device provided with user ID "B"

The server device can make a determination to transmit a banner signal to the terminal device on the basis of schedule information for 8 P.M. on 2015 Aug. 18, the time period from the most recent day of execution to the present, and other such factors.

Figure 9A:
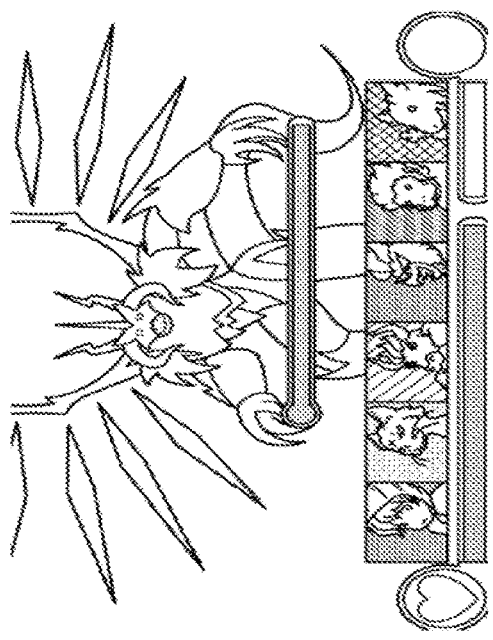
FIG. 9A shows one example of video information.
Figure 9B:
FIG. 9B shows one example of video information.
Figure 9C:
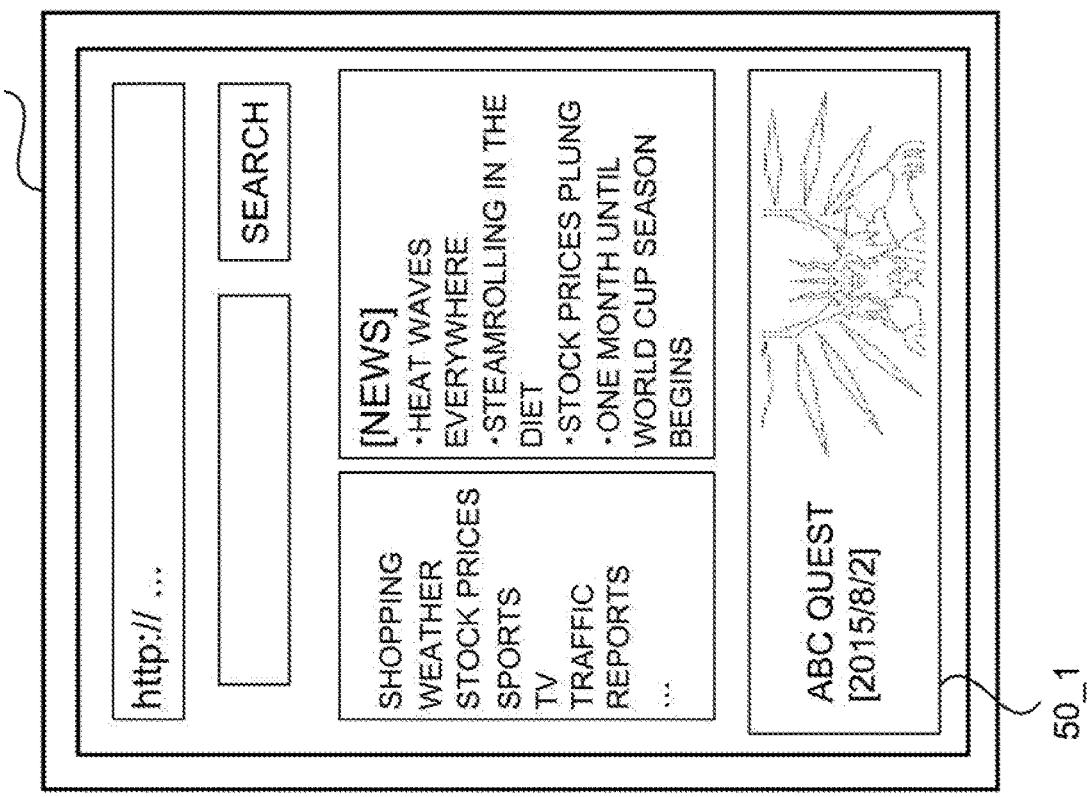
FIG. 9C shows one example of a banner.
Figure 10A:
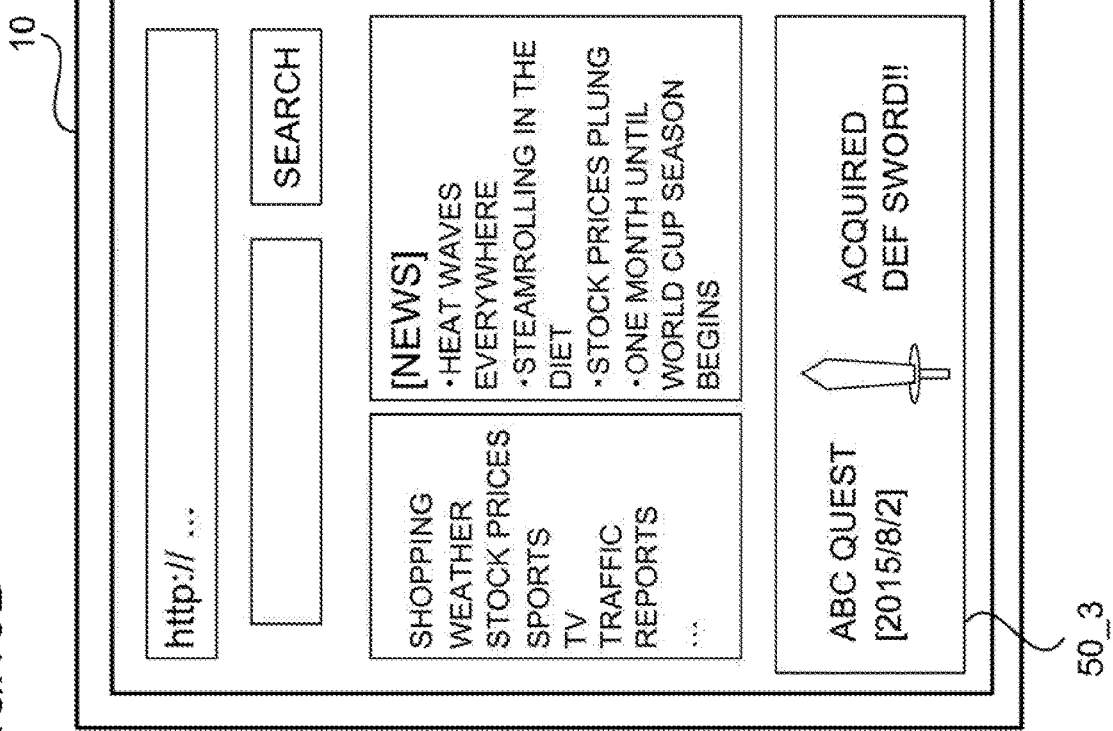
FIG. 10A shows one example of a banner.
Figure 10B:
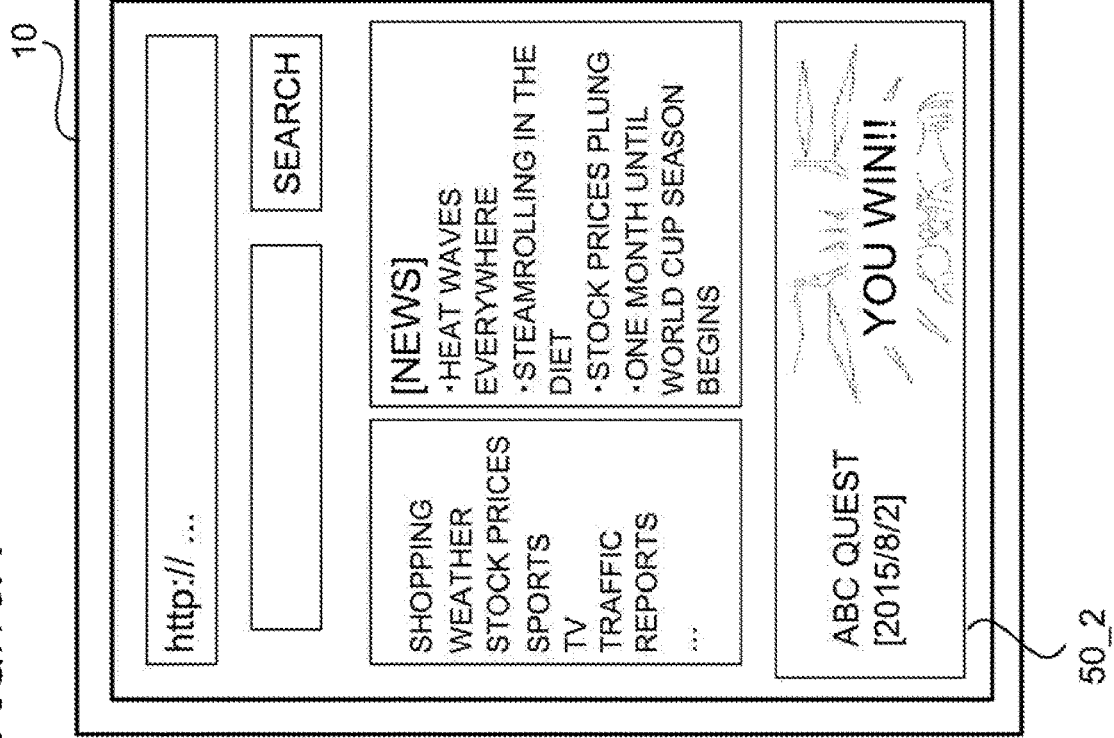
FIG. 10B shows one example of a banner.

The server device can then generate a banner signal on the basis of video information relating to a scene that was displayed during execution of the game "ABC Quest" in the terminal device on 2015 Aug. 2, and metadata of this information. Specifically, the banner signal can be generated on the basis of video information relating to a battle scene such as that shown in FIG. 9A and video information relating to a scene in which an item was acquired such as that shown in FIG. 9B, as well as metadata of this information. For example, the banner signal can cause banners 50_1 through 50_3 shown in FIGS. 9C, 10A and 10B to be successively displayed on the terminal device 10. The banner 50_1 displays the battle scene, and a date that was collected as metadata. The banner 50_2 displays an indication of victory in the battle scene, and the date. The banner 50_3 displays a scene in which an item was acquired, the name of the item (DEF Sword) that was collected as metadata, and the date.

An example was shown above in which a banner signal was generated on the basis of both video information relating to a battle scene and video information relating to a scene in which an item was acquired; however, a banner signal can be generated on the basis of any of this information alone.

(3) Terminal device provided with user ID "C"

The server device can make a determination to transmit a banner signal to the terminal device on the basis of schedule information for 8 P.M. on 2015 Aug. 18, the time period from the most recent day of execution to the present, and other such factors.

The server device can then generate a banner signal on the basis of video information relating to a scene that was displayed during execution of the game "GHI Puzzle" in the terminal device.

The content of the game "GHI Puzzle" in the disclosure shall be described here. In "GHI Puzzle," 16 objects are displayed in a four-row, four-column array. The user can change the positions of each of the 16 objects. For example, when the user performs a manipulation for moving the object (X) present in the second row and second column down two rows, the object (Y) originally present in the third row and second column moves to a position in the second row and second column, and the object (Z) originally present in the fourth row and second column moves to a position in the third row and second column. Specifically, the object (X), the object (Y), and the object (Z) are aligned in the stated order from the top before the manipulation, but the manipulation causes these objects to be aligned in the order of object (Y), object (Z), and object (X) from the top. In "GHI Puzzle," points are added when three objects having the same design are aligned vertically or horizontally. The three objects having the same design disappear after the points are added, and objects arranged in the rows above the three objects having the same design move down to lower rows. When there are no objects arranged in the upper rows, new objects appear from the top. In "GHI Puzzle," a higher number of points is added when a single manipulation causes sets of three objects having the same pattern to be aligned in succession. In "GHI Puzzle," the points acquired within a fixed time are assessed as a score.

Figure 11A:
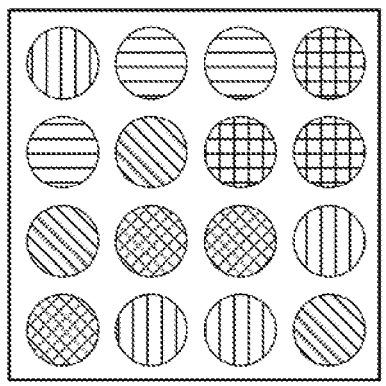
FIG. 11A shows one example of video information.
Figure 11B:
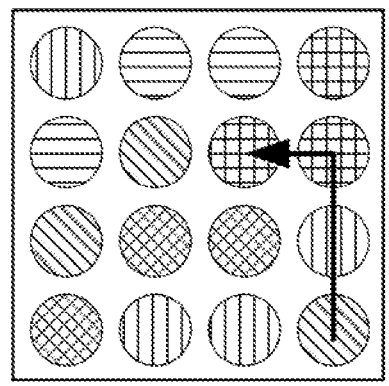
FIG. 11B shows one example of video information.
Figure 11C:
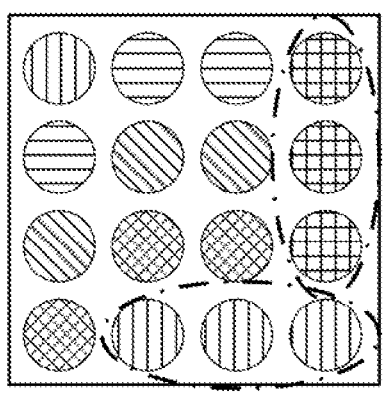
FIG. 11C shows one example of video information.
Figure 11D:
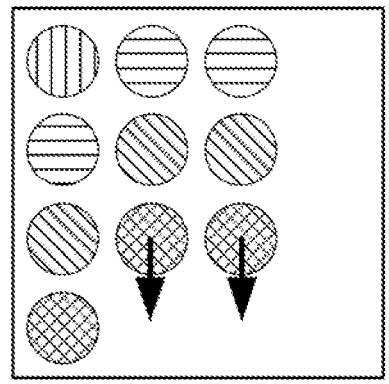
FIG. 11D shows one example of video information.
Figure 11E:
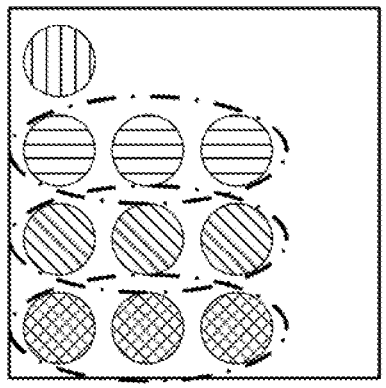
FIG. 11E shows one example of video information.
Figure 11F:
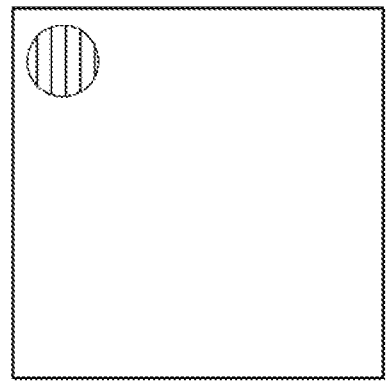
FIG. 11F shows one example of video information.
Figures 12A, 12B:
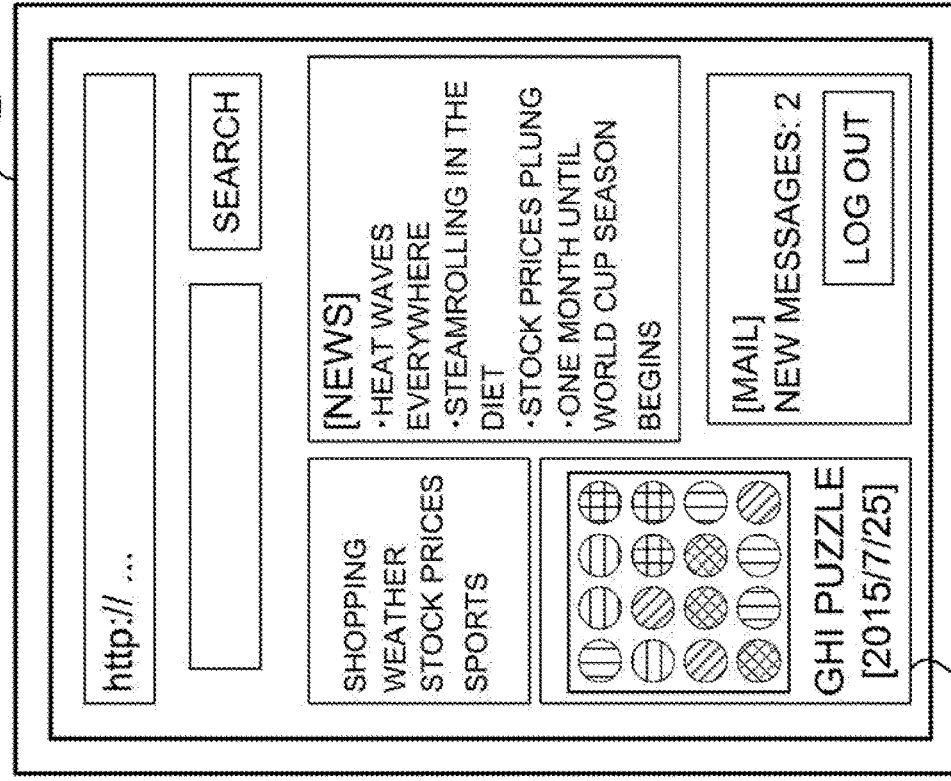
FIG. 12A shows one example of a banner.
FIG. 12B shows one example of a banner.
Figure 13A:
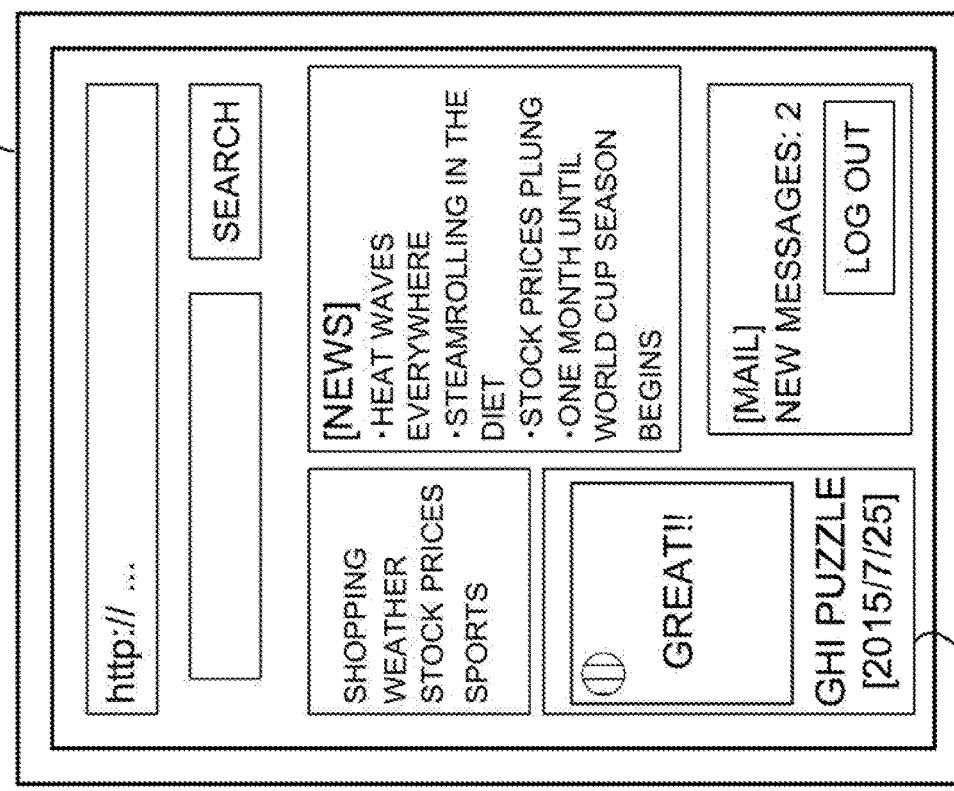
FIG. 13A shows one example of a banner.
Figure 13B:
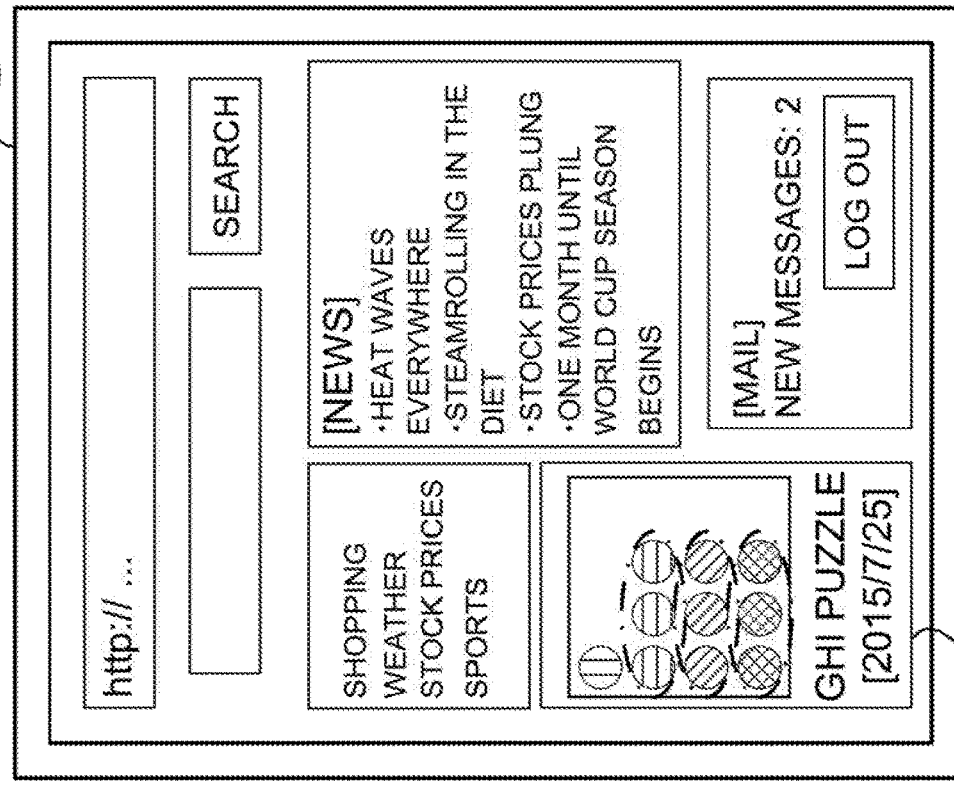
FIG. 13B shows one example of a banner.

FIG. 11A through 11F each show one example of video information relating to "GHI Puzzle," the video information being stored in the server device as scenes with favorable results. Specifically, FIG. 11A shows an array of 16 objects before a manipulation is inputted by a user. As shown in FIG. 11B, the object arranged in the fourth row and fourth column is moved two rows up and then one column left by a user. In this case, as shown in FIG. 11C, the three objects arranged in the first through third rows and fourth column each have the same design, as do the three objects arranged in the fourth row and second through fourth columns; therefore, points are added in "GHI Puzzle." Then, as shown in FIG. 11D, these six objects disappear, and the objects that were arranged in the rows above the six objects move down to lower rows. In this case, as shown in FIG. 11E, the three objects arranged in the second row and first through third columns, the three objects arranged in the third row and first through third columns, and the three objects arranged in the fourth row and first through third columns respectively have the same designs; therefore, points are added in "GHI Puzzle." Then, as shown in FIG. 11F, these nine objects disappear.

The server device can generate a banner signal on the basis of video information such as is shown in FIG. 11A through 11F and metadata of this information. For example, the banner signal can cause banners 51_1 through 51_4 shown in FIGS. 12A, 12B, 13A and 13B to be successively displayed on the terminal device 10. The banner 51_1 displays the scene before a manipulation is inputted by a user, and a date that was collected as metadata. The banner 51_2 displays an indication that the array of objects was changed due to manipulation by the user, and the date. The banner 51_3 displays an indication that the array was further changed following the manipulation, and the date. The banner 51_4 displays text collected as metadata.

An example was shown above in which a banner signal was generated on the basis of video information; however, a banner signal can be generated on the basis of video information and manipulation information. Specifically, if video information before manipulation by a user such as is shown in FIG. 11A and information pertaining to manipulation by the user such as is shown in FIG. 11B are used, a display such as is shown in FIG. 11C through 11F can be reproduced. Therefore, the video information from after the manipulation, which corresponds to FIG. 11C through 11F, does not necessarily need to be stored in the server device. In this case, the amount of server device memory that is necessary for generating a banner signal can be reduced.

(4) Terminal Device Provided with User ID "D"

The server device can make a determination not to transmit a banner signal to the terminal device on the basis of the fact that the most recent day of execution was the previous day (2015 Aug. 17).

(5) Terminal Device Provided with User ID "E"

The server device can make a determination to transmit a banner signal to the terminal device on the basis of schedule information for 8 P.M. on 2015 Aug. 18, the time period from the most recent day of execution to the present, and other such factors.

Figure 14A:
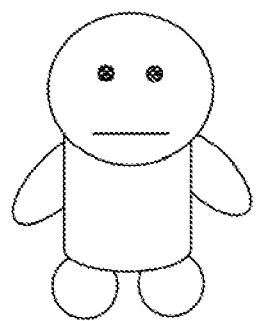
FIG. 14A shows one example of video information.
Figure 14B:
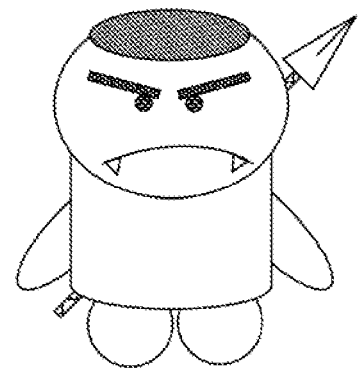
FIG. 14B shows one example of video information.
Figure 14C:
FIG. 14C shows one example of a banner.

The server device can then generate a banner signal on the basis of video information relating to a scene that was displayed during execution of the game "KLM Dragon" in the terminal device on 2015 Aug. 7, and metadata of this information. Specifically, a banner signal can be generated on the basis of video information relating to a scene in which a character such as is shown in FIG. 14A developed into a character such as is shown in FIG. 14B due to execution of the game on 2015 Aug. 7, and metadata of this information. For example, the banner signal can cause the banner 52 shown in FIG. 14C to be displayed on the terminal device 10. The banner 52 displays the character before and after development, and a date that was collected as metadata.

KEY

10 Terminal device
20 Server device
30 Network
101 Central processing unit
102 Communication unit
103 Storage unit
104 Input/output unit
105 Bus
121 Processing unit
122 Updating unit
123 Communicating unit
124 Converting unit
201 Central processing unit
202 Communication unit
203 Storage unit
204 Input/output unit
205 Timer unit
206 Bus
221 Processing unit
222 Updating unit
223 Communicating unit
224 Converting unit
225 Evaluating unit
226 Generation unit

What is claimed is:

1. A server device comprising:
a communicating unit configured to:
    receive a signal that includes banner generation information, the signal being transmitted from a terminal device, said terminal device capable of executing a first application and a second application that is different from the first application, and
    transmit a banner signal to the terminal device; and
a generating unit configured to generate the banner signal, said banner signal configured to indicate display of a banner corresponding to the first application on the terminal device displaying information by executing the second application, based on the signal that includes the banner generation information,
    wherein said banner generation information is collected from the terminal device while the first application is executing on the terminal device, and
    wherein the first application is terminated when the second application is executed and the banner is displayed on the terminal device.

2. The server device as in claim 1, in which the banner generation information includes video information relating to a video that was displayed on the terminal device during execution of the first application.

3. The server device as in claim 2, in which the banner signal is used for causing the video, a changed-perspective video in which the same setting as that in the video is displayed from a different perspective than that actually displayed on the terminal device, and/or non-displayed video which was not displayed on the terminal device but which could have been displayed following the video, to be displayed on the terminal device as a banner.

4. The server device as in claim 3, in which the banner signal is used for causing the video, the changed-perspective video, and the non-displayed video to be displayed on the terminal device as a banner, and causing audio collected during execution of the first application to be emitted from the terminal device.

5. The server device as in claim 1, in which:
the first application is a game in which a score is assessed; and
the banner generation information includes information relating to the score.

6. The server device as in claim 5, in which the banner signal is used for causing a banner that includes the score to be displayed on the terminal device.

7. The server device as in claim 1, in which:
the first application is a game in which items are acquired over the course of execution; and
the banner generation information includes information relating to the items.

8. The server device as in claim 7, in which the banner signal is used for causing a banner that includes the items to be displayed on the terminal device.

9. The server device as in claim 1, in which:
the first application is a game in which a character develops over the course of execution; and
the banner generation information includes information relating to the developed character.

10. The server device as in claim 9, in which the banner signal is used for causing a banner that includes the developed character to be displayed on the terminal device.

11. The server device as in claim 1, in which the server device has an evaluating unit for making a determination to transmit the banner signal to the terminal device when at least one of the following conditions is satisfied: a time period in which the first application has not been executed exceeds a prescribed time period; the second application is associated in advance with the first application; the environment during execution of the second application reaches a prescribed state; or the banner generation information satisfies a prescribed condition.

12. A non-transitory computer-readable medium in which a computer program is stored,
the computer program controlling a computer configured to receive or transmit signals to or from a terminal device, said terminal device capable of executing a first application and a second application that is different from the first application,
the computer being controlled to generate a banner signal based on a signal that includes banner generation information, said banner signal configured to indicate display of a banner corresponding to the first application on the terminal device displaying information by executing the second application,
wherein said banner generation information is collected from the terminal device while the first application is executing on the terminal device, and
wherein the first application is terminated when the second application is executed and the banner is displayed on the terminal device.

13. A method comprising:
receiving a signal that includes banner generation information, the signal being transmitted from a terminal device, said terminal device capable of executing a first application and a second application that is different from the first application;
generating a banner signal based on the banner generation information, said banner signal configured to indicate display of a banner corresponding to the first application on the terminal device displaying information by executing the second application; and
transmitting the banner signal to the terminal device,
wherein said banner generation information is collected from the terminal device while the first application is executing on the terminal device, and
wherein the first application is terminated when the second application is executed and the banner is displayed on the terminal device.

* * * * *